Feb. 2, 1971    G. W. PERBIX ET AL    3,559,452
THERMAL ANALYSIS OF MOLTEN STEEL
Filed Sept. 25, 1967    4 Sheets-Sheet 3
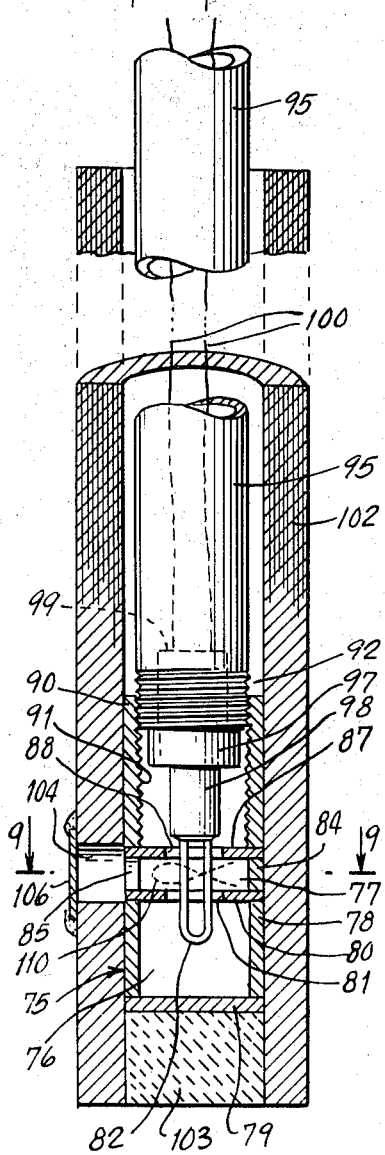
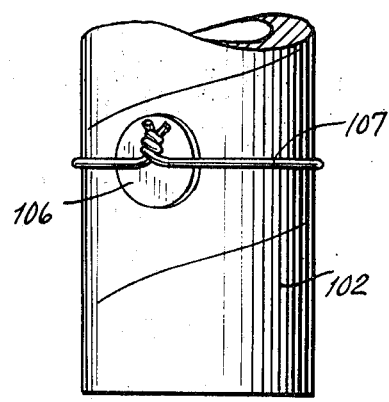
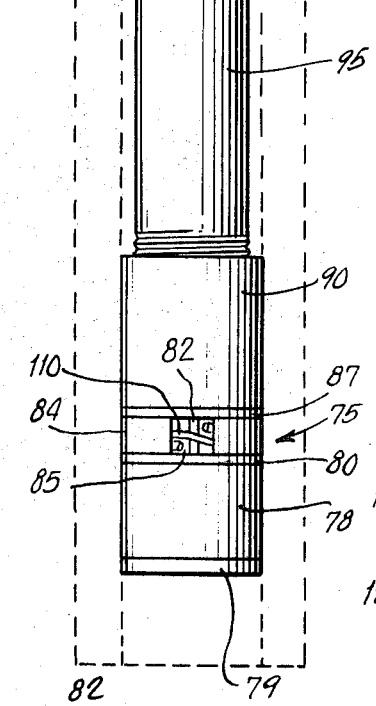
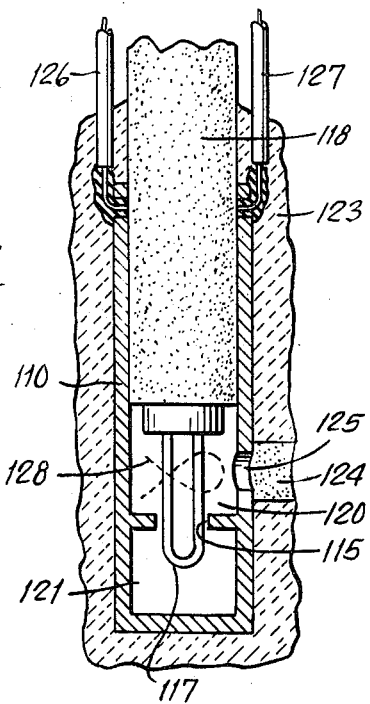
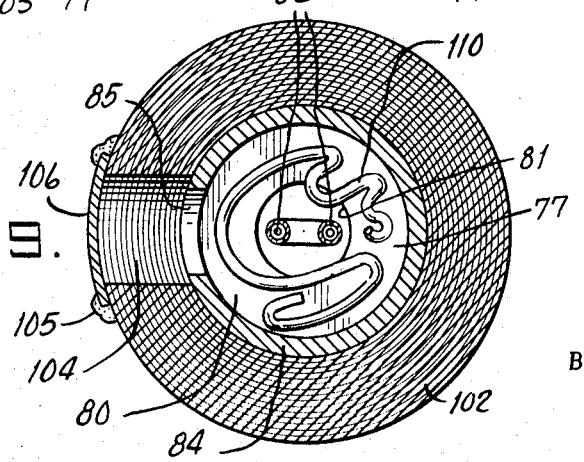
INVENTORS
GOTTFRIED W. PERBIX
DALE J. MACZKA
BY CECIL B. GRIFFITH
PESI N. DASTUR
Joseph W. Malleck
ATTORNEY Feb. 2, 1971  G. W. PERBIX ET AL  3,559,452
THERMAL ANALYSIS OF MOLTEN STEEL
Filed Sept. 25, 1967  4 Sheets-Sheet 4
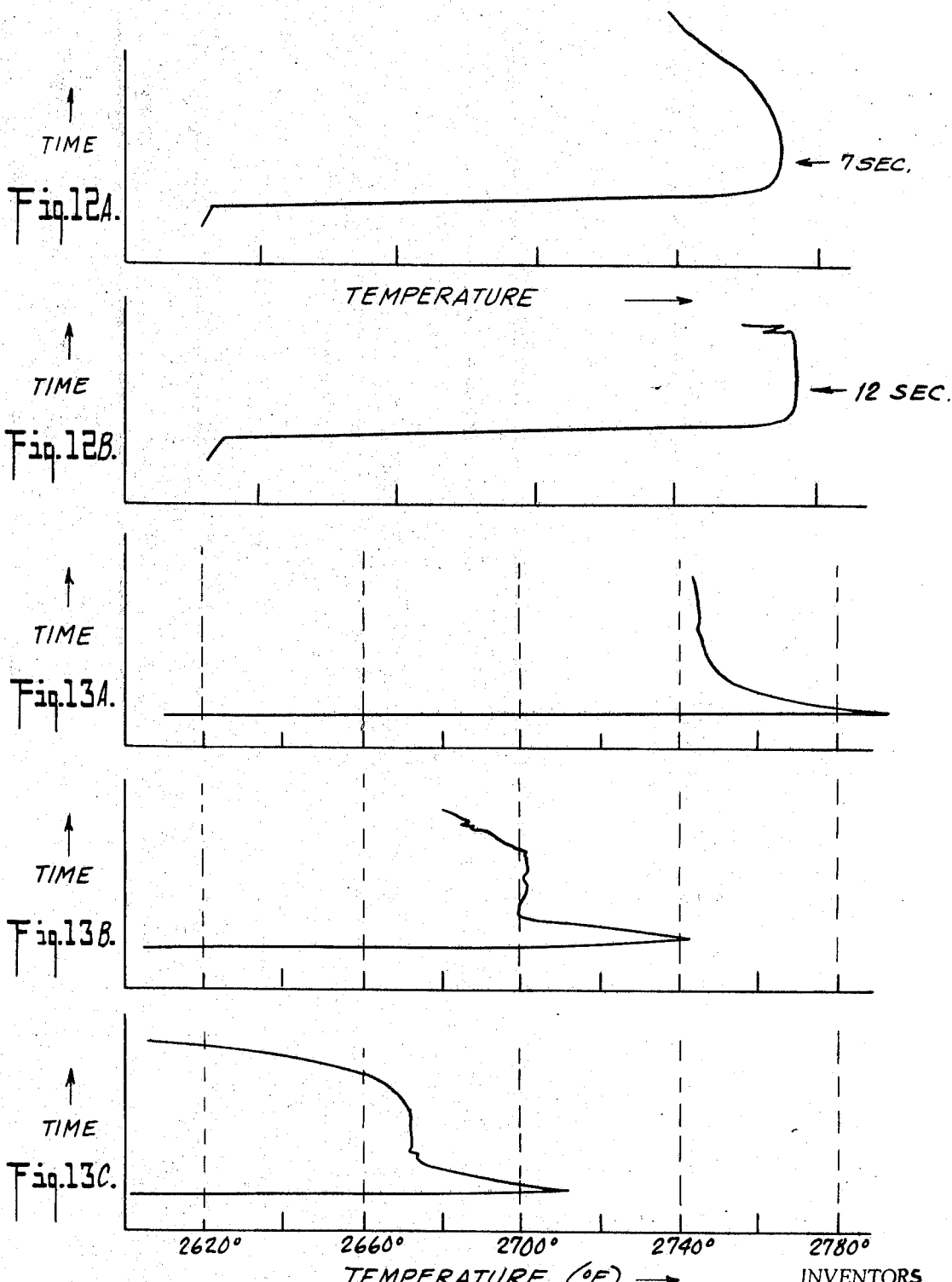
INVENTORS
GOTTFRIED W. PERBIX
DALE J. MACZKA
BY CECIL B. GRIFFITH
PESI N. DASTUR
Joseph W. Malleck
ATTORNEY

United States Patent Office 3,559,452
Patented Feb. 2, 1971

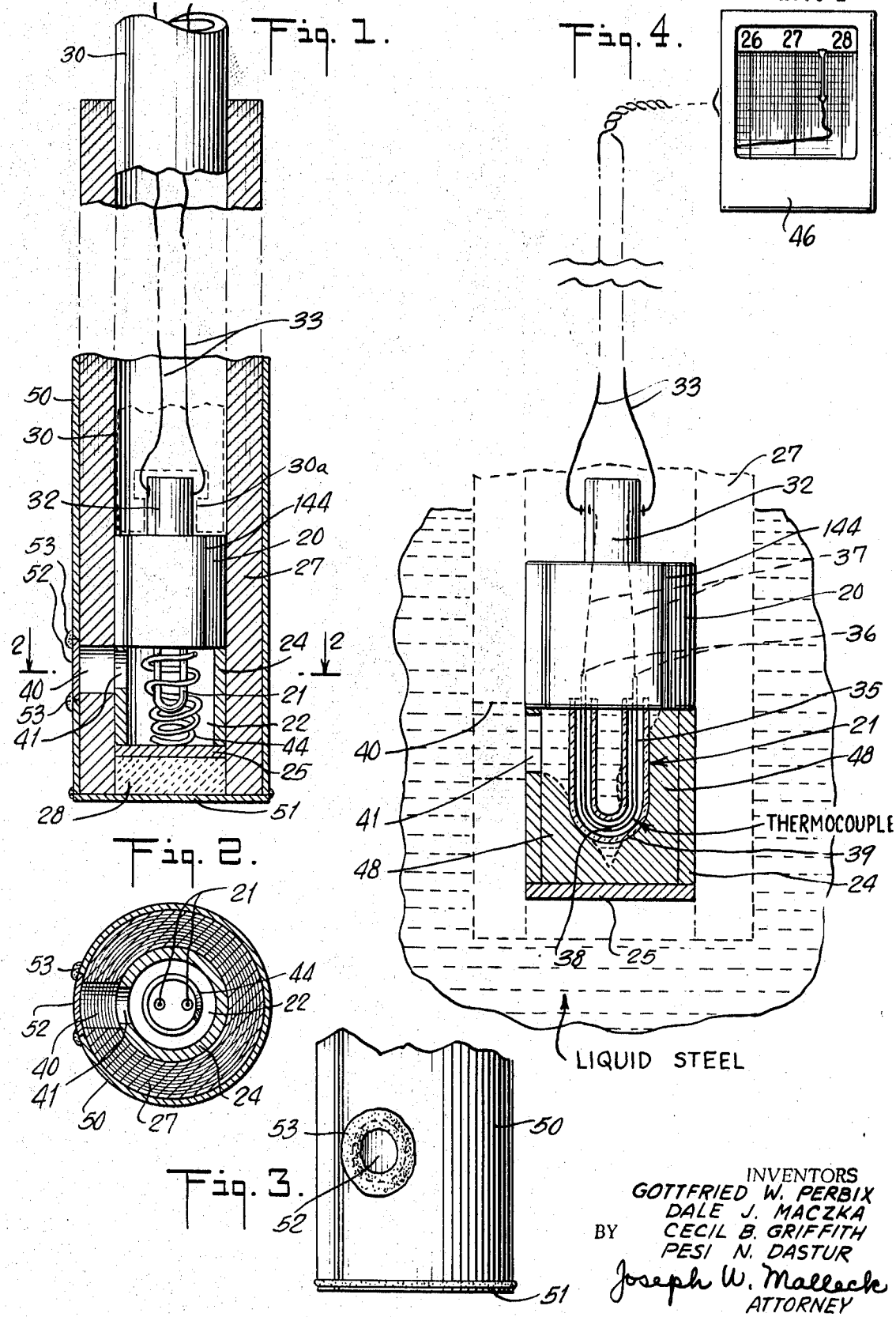

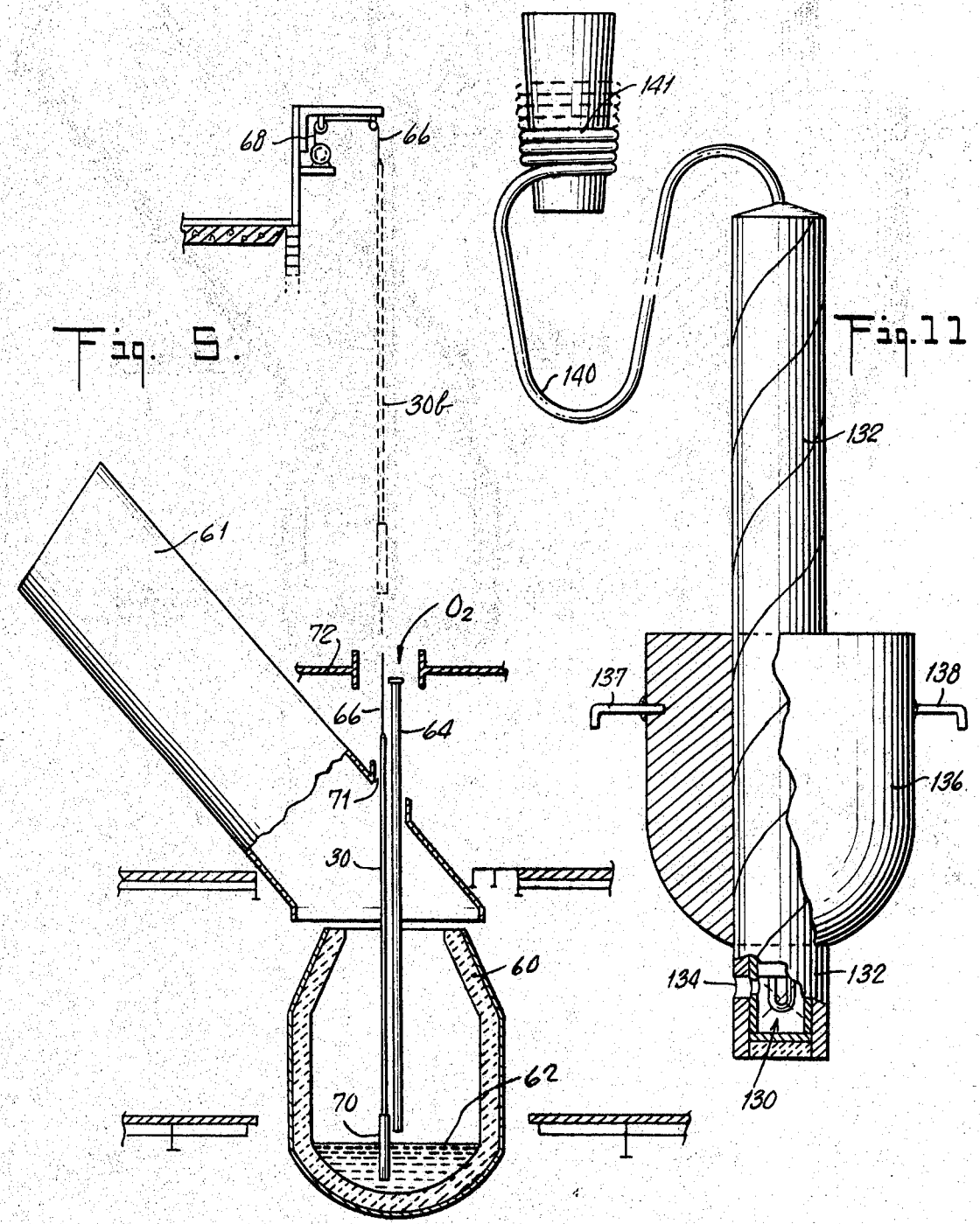

3,559,452
THERMAL ANALYSIS OF MOLTEN STEEL
Gottfried W. Perbix, Chagrin Falls, Dale J. Maczka, Independence, Cecil B. Griffith, North Royalton, and Pesi N. Dastur, Brecksville, Ohio, assignors to Republic Steel Corporation, Cleveland, Ohio, a corporation of New Jersey
Filed Sept. 25, 1967, Ser. No. 670,273
Int. Cl. G01n 25/02
U.S. Cl. 73—17    10 Claims

ABSTRACT OF THE DISCLOSURE

Insertable probes for thermal analysis of molten metal comprise a sampling chamber constituted of chill metal such as steel, enclosing a thermocouple and mounted for insertion into the molten metal, with surrounding material such as heavy cardboard or refractory, to impede destruction of the chamber. Protected conductors for the thermocouple extend out of the furnace to the translating device. The molten metal enters the chamber through an opening at or near the top, the chill metal functioning to freeze the received sample. For special reliability an entrance chamber, also surrounded with chill metal and containing the kill metal, is traversed by the entering sample enroute to the test chamber below.

FIELD OF THE INVENTION

This invention relates to the thermal analysis of molten metal and in a particularly important aspect is concerned with such analysis of molten steel, as in the course of production. More specifically the invention is directed to the provision of apparatus, constituting or including a probe or like insertable into a body of molten steel, to obtain an essentially immediate analytical response indicative of the composition of the metal, notably for example to ascertain the carbon content or equivalent information characteristic of the metal at any desired stage of its production. The invention further extends to novel procedure for instantaneous or rapid analysis of molten metal, e.g. steel in the process of making it in a suitable furnace, including particularly furnaces of the so-called basic oxygen type.

Thus the invention is designed to provide a coordinated operation of sampling and thermal measurement, capable of being performed in an extremely rapid fashion and conveniently within the body of metal in the furnace.

DESCRIPTION OF THE PRIOR ART

In making steel by the basic oxygen process, the melting and refining operation is compressed into a relatively short time, usually twenty to thirty minutes, while the nature of the furnace structure employed for such process makes it difficult to take and remove samples for analytical purposes. Spoon sampling of the sort conventional in open hearth operation would require interrupting the blow in the basic oxygen furnace and turning the vessel to the down position for access to the melt. Such procedure is entirely impractical, and even though a sample were obtained, with or without the interruption, conventional chemical analysis could not provide results fast enough for control of an off-target heat.

Heretofore control of the process has been essentially limited to charge calculations, temperature determinations, and off-gas analysis during the oxygen blow. Thus calculations prior to the start of a heat are aimed at computing the proper metal, flux and oxygen batches necessary to produce a desired amount of steel under specific conditions of metal temperature and additions to the bath. Probes or bombs are available for essentially instantaneous determination of melt temperature, while off-gas analysis affords a continuous reading of carbon leaving the furnace (as carbon oxides), but despite all of these data, substantial errors may occur, in attempting to control the process as for attainment of a target content of carbon, because of inaccuracy in knowledge of original carbon content.

Thus for example, even a small error in the calculation of carbon content in the charge may result in a large departure from desired results at the time of turndown, when a sample of the metal may be taken for analysis before pouring. In such case it is necessary to restore the vessel to operating position and perform a re-blow, with the view of achieving the desired composition of steel on final turndown. As will be apparent, there has not been available a suitable means for rapid or instantaneous chemical analysis of the metal bath that would permit correction or adjustment of the process, before any turndown, yet it is apparent that the provision of such analysis would greatly facilitate such controlling operation as with computer or data processing instrumentalities.

It has been known that essentially instantaneous carbon analysis of liquid steel, over a useful range of carbon content, can be achieved upon a withdrawn sample of the metal, by appropriate thermal means. For example, by taking a spoon sample from an open hearth furnace, the metal can be deposited in an available device where it is allowed to freeze around a thermocouple element from which a continuous temperature recording is made. It has been found that the freezing point of iron, particularly the so-called liquidus temperature, is depressed in a proportional relationship to the carbon content of the metal, as over a range, for example, of 0.03% to 2% carbon. Thus with the sample-measuring equipment mentioned above, a temperature recording shows a definite, more or less straight line of constant temperature after the sample has begun to cool, such pause in the fall or change of temperature being characteristic of the heat effect that is related to solidification. This may be broadly characterized as accurately related to the freezing point, although not necessarily the physical liquidus arrest temperature. Hereafter, reference to this "freezing point" takes into consideration this slight terminology difference. As read or otherwise derived from suitable instrumentation, this freezing temperature is translatable into a carbon determination, varying in a proportion of about 0.01% of carbon for each 1.5° F., the actual determination being necessarily less exact in practice, but nevertheless sufficiently accurate for process control purposes.

As will be understood, thermal analysis of this sort has not been feasible for the basic oxygen process, because spoon or like samples cannot be taken without interrupting furnace operation, and indeed additionally because even the time of taking and pouring a sample may be significantly too long for optimum use of the reading under the circumstances. While it has been proposed in the case of certain non-ferrous metal alloys having relatively low melting points, to make analysis for an alloying ingredient by simultaneously withdrawing a sample in a device equipped with thermoelectric measuring means and also providing a sample of melted unalloyed metal at the same temperature, and then reading the difference of freezing points of the bodies while they cool in the device at a locality away from the melt which has been tested, systems or procedure of such character are wholly inapplicable to the requirement of instantaneous measurement of molten steel deep within a basic oxygen furnace at very high temperature, i.e. under conditions of extraordinary severity and great inaccessibility.

It may be noted additionally that for carbon determination by thermal analysis, the effect of oxygen in the metal should be eliminated, as this is usually the only other element which is present in ordinary carbon steel in sufficient amount to have a significant bearing on the liquidus temperature. As heretofore practiced, e.g., for tests of metal in an open hearth furnace, the interference of oxygen is avoided by killing the sample in the spoon with metallic aluminum. Under such circumstances, good accuracy of the determination is achieved, as indicated above.

As stated, suitable means or procedure for chemical analysis of the bath in the basic oxygen process have not been known, and the chief object of the present invention is to provide apparatus and methods that are significantly useful for such purpose, particularly probes and probe systems of reliable character that yield essentially immediate determinations of carbon content, with good accuracy.

SUMMARY OF THE INVENTION

To the foregoing and other ends, an important aspect of the invention extends to apparatus and procedure whereby a probe or equivalent device is inserted into the molten metal, as by downward displacement through the top opening of a furnace vessel, and a sample quantity of the metal is caused to flow into a chamber of the probe, and indeed very preferably is thereby entrapped in the chamber where it comes in contact with a temperature-sensitive element, while at the same time heat is rapidly removed from the enclosed sample sufficiently to bring the latter to a freezing point, e.g. the liquidus temperature. Most advantageously the removal of heat is effectuated by contact of the sample with a surrounding mass of metal or ceramic—which meets stability and capacity requirements—which may form at least a major part of the chamber enclosure. Attack or penetration of the surrounding liquid metal, particularly with respect to the enclosure of the chamber, is appropriately prevented for the required short interval of probe insertion and metal entrapment and freezing, as by encasing the chamber and thermocouple support with appropriate material for delaying or resisting the effects of the high temperature bath.

In carrying out the foregoing, the analytical operation of the process involves sensing the temperature of the metal sample in the probe, for example with a thermocouple, over an interval immediately following insertion of the device, particularly so as to detect the significant value of freezing point, such determination being achieved by appropriate instrumentalities, such as a recording device connected to the thermocouple, or equivalent means for translating the sensed signal for indicating or process controlling function.

Particularly advantageous embodiments of the probe, indeed as presently preferred, comprise a thermocouple element arranged to project (e.g. downwardly, in operating position of the device) from suitable supporting structure, together with enclosure means defining a chamber around the thermocouple element, at least a significant part of the interior chamber wall being constituted as a ceramic or metallic chill structure, as for instance a relatively thick-walled sleeve of steel. The assembly further includes structure or material encasing the thermocouple support and the chamber-defining chill, of such nature as to preserve the integrity of the received metal sample, and the required function of absorbing heat from it, for the period that the probe device remains submerged. Such protective enclosure may consist, for example, of refractory material or a massive cardboard body and very preferably extends upwards, or may have an associated refractory portion disposed in an upward region, for enclosing the electrical conductors to the thermocouple.

Access of molten metal into the chamber is provided, a special feature of preferred embodiments of the invention being that such access is constituted by at least one lateral port, traversing the exterior sheathing and the chill wall. By location of this opening (in double chamber designs) at an upper part of the chamber, unusually satisfactory and reliable results have been attained in the entrapment of a desired sample and in effectuating necessary absorption of heat for the intended analytical operation by sensing the freezing temperature.

For utilization of the device deep within the vessel of a basic oxygen furnace, the probe can be mounted at the end of a suitable elongated lance element, arranged to be moved down to or near the molten bath, and to be withdrawn therefrom, the electrical leads from the thermocouple being carried through the lance for connection to appropriate instrumentation. In such cases, the probe may serve a further function, namely to obtain and withdraw a solidified sample of the steel, as for examination and other modes of analysis. An alternative embodiment of the invention involves constituting the probe as a so-called bomb, i.e. incorporating it with a heavy weight or sinker above the sampling chamber, so that it may be dropped free into the molten metal, with suitable pay-out of the electrical conductors that are sufficiently insulated to resist destruction during the relatively brief interval required for measurement. Although it is conceivable that at least part of the structure constituting a probe, notably of the lance-carried type, might be reusable, the assembly of the thermocouple, its support and the chamber-defining structure is at present preferably made as an expendable unit. Indeed a special advantage, particularly for the lance-mounted device, is that it can be relatively inexpensive, yet function with good accuracy and reliability.

Unusually effective results for the thermal analysis of the basic oxygen process are attainable with a further structural arrangement of the invention. Specifically the sample chamber is constituted in vertically successive sections, conveniently separated by a horizontal partition, centrally apertured to admit the thermally sensitive element and to provide passage of the liquid steel. Thus the entrance port is located in a wall of the upper section, and metal passes through it and downward into the lower section, filling the entire chamber space. Advantageously the chamber may be entirely constructed of steel of suitable thickness, i.e. the cylindrical wall, bottom and intermediate partition, arranged to be capped by the heat resistant structure of the thermocouple support. Thus essentially the entire wall area of the chamber sections functions as chill and provides relatively prolonged heat absorbing action, for special utility in furnace baths where substantial superheat has been reached. The thermocouple, being conveniently in this and other instances a U-shaped structure comprising the thermocouple wire element encased in a quartz tube, is effective in the lower section of the chamber for its desired temperature-sensing function.

As indicated above, it is normally desirable that the steel be killed, in order to avoid effects of oxygen adverse to the significance of freezing point determination as representative of carbon content. Very conveniently, the procedure and devices of the invention provide for such operation by including a quantity of suitable oxidizable metal (such as aluminum or silicon) in the sampling chamber, e.g. a length of aluminum wire. Thus as the molten steel enters, prompt reaction occurs with the aluminum so that the steel is in killed state as it begins to solidify. In the plural section device, the aluminum can be disposed in the upper compartment, whereby the reaction occurs as the steel comes in, so that in the lower, temperature-measuring area, the thermal effects are essentially only those of cooling.

As will now be appreciated, probe devices of the described character are unusually effective in accomplishing the objects of the invention, and have been found to afford a prompt and reliable mode of thermal analysis, indeed essentially instantaneous in that the response occurs in times of the order of five to fifteen seconds from immersion. Translated into carbon content, the readings have an accuracy comparable to that of other modes of carbon determination and are eminently suitable for correspondingly rapid control of the steel making process, as to permit advance determination of the time for ending the oxygen blow, or of requirements for chemical addition or the like. The probes are simple and rugged and may be relatively inexpensive, while their use, in either the lance-supported or bomb form, is free of unusual hazard, e.g. in that the necessary manipulations can be performed from suitably screened localities well above the furnace opening, a convenient line of access being through the hood aperture which admits the oxygen lance. The foregoing and further features and parameters of the invention are described in detail hereinbelow.

BRIEF DESCRIPTION OF THE DRAWINGS

Certain embodiments of the apparatus of the invention and illustrations of the practice of the procedure are set forth, by way of example, in the accompanying drawings, wherein:

FIG. 1 is a central vertical section, with certain parts in elevation, of one form of probe device;

FIG. 2 is a horizontal section on line 2—2 of FIG. 1;

FIG. 3 is a fragmentary elevational view of the probe of FIG. 1;

FIG. 4 is a schematic view, showing some parts of the probe on enlarged scale and illustrating the sampling and thermal analysis function;

FIG. 5 is a further, essentially schematic view, partly in vertical section, showing the utilization of the probe in a basic oxygen furnace;

FIG. 6 is a vertical section of a presently preferred modification of the pobe;

FIG. 7 is an elevational view of the central structure of the probe;

FIG. 8 is a fragmentary elevation of the lower part of the probe of FIG. 6;

FIG. 9 is an enlarged horizontal section on line 9—9 of FIG. 6;

FIG. 10 is a vertical section of another, advantageous embodiment of the probe;

FIG. 11 is a view partly in elevation and partly in section of a bomb-type probe embodying the invention;

FIGS. 12–A and 12–B illustrate graphic recordings representative of the thermal analysis procedure of the invention; and FIGS. 13–A, 13–B and 13–C show further representative temperature recordings, likewise illustrating the analytical operation.

DETAILED DESCRIPTION

Referring to FIGS. 1 to 4 of the dawings, the immersion probe here shown in its vertical position of use comprises a cylindrical supporting structure 20 for a U-shaped thermocouple device 21 that projects into a sampling chamber 22. The chamber has a cylindrical metal wall 24 and preferably also a bottom plate 25, that together serve as a chill for absorbing heat from the received molten steel to effectuate the desired freezing operation. While other chill metals, such as copper or brass, can presumably be employed in some cases, unusually successful results have been obtained with ceramic or steel, e.g. ordinary plain steel or stainless steel, as by making the element 24 of a section of stainless steel tubing having a wall thickness in the range of ⅛ to ⅜ inch, with the circular bottom plate 25 (which may be welded to the tubing 24) also made of stainless steel of like thickness. Steel chill structures, constituted as sample chamber enclosures, have an adequately high chilling capacity, are relatively inexpensive (as is desired for a disposable probe) and do not require extraordinary protective jacketing in order to perform their intended function without adverse effect from the surrounding metal bath.

The described assembly is advantageously encased in material for delaying access of molten steel to the exterior of the chill parts 24–25 and the thermocouple support 20, namely refractory or slowly-destroyed material of quantity or character (or both) affording significant thermal insulation, examples being cast or otherwise formed refractory bodies, and massive bodies of cardboard, i.e. as made of a large multiplicity of layers of paper and having a thickness, for example, of ⅜ to one inch. Thus the device shown has a long tubular shell 27 of thick cardboard snugly fitting the parts 20, 24, and has a closure 28 at the bottom end, of refractory composition, e.g. a cast, ceramic or like body of material unaffected by the temperatures of molten steel. The tube 27, which may be of a type formed by spiral paper wrapping, is advantageously several feet long, e.g. five feet or more, and is adapted to receive a lance element 30 which may be a very long section of steel tube carrying at its lower end a socket or receptacle indicated at 30a and arranged to engage a plug 32 projecting upward from the thermocouple support 20, electrical connection being thereby effected with the thermocouple. The lance 30 is gripped or engaged within the tube 27, to hold the latter for driving the probe assembly into submergence in the furnace bath, the insulated electrical conductors from the thermocouple being carried up through the lance as indicated schematically at 33.

It may be explained that the structure of the thermocouple support 20, the thermocouple device 21, the plug and receptacle arrangement 32–30a, and the surrounding disposition of a heavy paper tube as at 27 to be fitted on a lance 30 can be similar or indeed essentially identical to corresponding parts of immersion probes now available for measuring the temperature of liquid steel in furnaces, and may be constituted in other ways than as shown in FIGS. 1, 2 and 3, as for instance pursuant to other known forms of construction for supporting a thermocouple element in projecting position at the end of a lance. Accordingly, details of the plug 32, the receptacle 30a at the end of the lance element 30 and the structure of the support 20 may be conventional and need not be shown. Indeed, for clarity, the receptacle 30a of the lance 30 is set forth only in dotted lines in FIG. 1. As will be understood, the structure 20 may be a suitable arrangement of a heat-resistant plastic shell with interior ceramic refractory parts, for carrying the ends of the thermocouple wire element 35 and enclosing the so-called cold junction connections 36 between the element 35 and the leads 37 extending to the ceramic plug 32 (FIG. 4).

As also conventional, the thermocouple wire unit 35 is U-shaped with its sensitive junction 38 at the bottom and may be enclosed in a protective sheath such as the fused quartz tube 39, these parts being shown in exaggerated size in FIG. 4, for clarity. For open measurement, the thermocouple device as shown at 29 is conventionally enclosed by a thin metal cap which melts or dissolves soon after immersion, but such cap has been found unnecessary in most cases for the present device and is preferably omitted.

Access of the molten metal bath to the chamber 22 is provided by a port 40 in the wall of the protective tube 27 and a like port 41, in registration therewith, in the tubular chill element 24. It has been found very desirable that the admission of molten metal to the sampling chamber 22 by effected laterally, e.g. above the bottom of the chamber through one or more side openings, very preferably located at an upper or uppermost position (as shown) so that the metal flows rapidly down into the chamber and a sufficient body of it is there positive entrapped. The dimensions of the openings 40–41 are correlated with the volume of the chamber, it being found, for instance that where the latter volume is from one to two cubic inches, a single port arrangement about ½ inch to ¾ inch in diameter is sufficient and permits effective function of the chill. As explained above, it is ordinarily desirable that the entering steel be killed and to that end a quantity of aluminum metal may be disposed initially in the chamber 22, e.g. as shown by the coil of aluminum wire 44. For ordinary steel, the amount of aluminum, i.e. the so-called amount of kill, may range from 0.5% to 1% by weight of the steel filling the sampling chamber, particularly good results being attained with about 1% kill although this value may manifestly vary, even outside the range, depending on metallurgical requirements. When the metal flows into the chamber 22, the reaction of the aluminum metal is essentially immediate and as explained above, serves to eliminate the effect of the oxygen content of the steel on the freezing temperature, i.e. the aluminum thus oxidifies and avoids an effect that would mask the desired determination of carbon content as a function of freezing point. The aluminum kill has also been found to have a further, desirable function in the present probes and procedures for thermal analysis, namely in eliminating disturbances that might occur during the measurement interval, owing to occurrence of the carbon-oxygen reaction during solidification of the metal.

In using the probe it is inserted vertically downward, as by means of the lance 30, into the molten bath, i.e. to the extent necessary for submergence of the sampling chamber well within the liquid steel and below any slag layer at the upper surface. Ordinarily the bottom of the device need not be more than two or three feet below such surface, so that the protective tube 27 or like structure extends well above, around the reusable lance 30. As diagrammatically shown in FIG. 4, the molten metal flows into the chamber through the port 40–41, reacts at once with the aluminum kill and immediately begins to lose heat to the surrounding chill structure 24, 25, which is essentially at room temperature at the time of insertion.

The conductors 33 having been connected to a suitable measuring instrument such as the temperature recorder 46, this recorder is set in operation to read the temperature sensed by the thermocouple element 35, at least as soon as the probe enters the bath. In general, the measured temperature promptly rises to a maximum as the chamber fills, and then commences to drop while heat is absorbed from the sample by the chill. When the freezing process begins, the metal is considered to be at the liquidus temperature, and this condition is indicated by a continuance of the record or indication at substantially constant value, being a so-called isotherm; when the record is on a vertically moving chart with temperature changing along a horizontal coordinate, such liquidus arrest or isotherm will appear as a more or less vertical line. To indicate this situation, the sample is shown as partially solidified at 48 in FIG. 4, it being understood that such showing is merely intended as a hypothetical representation of the freezing process and may not necessarily depict the actual liquid-to-solid transition. In any event, the arrest or isotherm point on the curve is read as a significant freezing temperature and can be interpreted, by calibration in accordance with the known relationship of freezing point to carbon content, as a reading of such content in the sample. With probes of the sort here shown this point can ordinarily be read within five to fifteen seconds of probe insertion, a time well within the life of the device in the furnace.

The lance is then withdrawn, and all of the structure, except the lance element 30 itself, may be discarded as having been expended by the test. The solidified sample, however, may be segregated from the other structure, by cutting if necessary, for any purpose desired, such as for chemical or metallurgical testing or examination.

It has been found desirable, for insurance of preserving the sample during the necessary interval to complete the temperature reading and withdrawing the lance, that best avoidance of destruction or contamination is had where the lower part of the probe is covered with a sheet metal covering or liner, i.e. around the tube 27, at 50 and across its bottom at 51. This may be made of ordinary sheet steel, and is found effective in prolonging the integrity of the assembly during the final part of the operation.

Likewise in all cases it is preferable to provide the port 40 with a temporary lid 52, as a thin, shaped disk of metal such as steel, copper, brass or aluminum, held in place by refractory cement 53. This lid slightly delays passage of liquid into the sample chamber, particularly to avoid ingress of slag, but it melts or dissolves rapidly upon exposure to the molten steel, leaving the port clear for the metal to enter.

It will be understood that the thermocouple 35 may comprise any combination of metals appropriate for measuring the temperature of the molten bath. Conventional assemblies are of platinum and platinum-rhodium (10% or 13%) wire, but any suitable thermocouple combination or structure may be employed, including other significant metal combinations as known or available for the purpose. The measuring instrument 46, whether for yielding a visual indication or record or for translating the measurement for process control purposes, should of course be adjusted or calibrated in accordance with the nature of the thermocouple, as in a manner well known for making temperature readings of liquid steel.

FIG. 5 schematically illustrates one way of utilizing the probes of the present invention for thermal analysis in the basic oxygen process employing a conventional open mouth vessel 60, shown in its upright position and having the usual hood structure 61 for removal of gases and the like. The molten bath of steel in process is indicated at 62, e.g. as under treatment by oxygen supplied through the usual lance 64. The supporting lance 30 may be suspended by a cable 66, which is raised or dropped with a hoist 68 situated at an upper locality of the building. Thus the probe device 70 can be lowered into suitably submerged position by dropping the lanch 30, the weight of the latter being sufficient to insure desired vertical immersion. As shown the assembly may traverse a suitable small opening 71 in the hood 61 and the necessary affixation of successive new probes at the end of the lance can be achieved at a service floor 72, the lance being also shown in dotted line at its upper, withdrawn position 30b. The electrical conductors leading from the lance can extend to the necessary recorder or instrumentation at any desired locality.

The entire analytical operation is conveniently rapid, involving applying the probe to the lance, dropping the assembly into the bath and taking the temperature reading for the desired ascertainment of freezing point, then withdrawing the lance and removing and discarding the remains of the probe, except for preservation of the solidified steel sample if it is to be used. While it is presently contemplated that the reading will be completed before the hoist 68 is operated to raise the lance 30, and indeed it is a special advantage of the probe devices that this mode of operation can be accommodated, it is conceived that removal of the probe may at least in some cases be initiated as soon as the sampling chamber is filled. It is nevertheless important that the chill effect be sufficient to accomplish at least an initial stage of freezing despite the severe conditions of submergence or other disposition in the furnace, since limitations of time do not permit reliance on heat removal otherwise than by the chill.

FIGS. 6 to 9 show an unusually effective and presently preferred form of immersion probe in which the chamber-defining chill structure 75 is made to provide a plurality of vertically successive regions, including particularly a sampling chamber proper 76 and above it, an entrance chamber 77. As before, the inside enclosure may be made of thick walled stainless steel tubing and transverse plate means of similar gauge, also of stainless steel. Thus the chamber 76 is surrounded by a tube section 78 and is closed at the bottom by a circular plate 79 and partly closed at the top by a partitioning plate 80 having a central circular opening 81 sufficient to admit the downwardly projecting U-shaped thermocouple device 82 (so that its sensitive element is located in the chamber 76) and also to permit free passage of molten steel down into the chamber.

Above the partition 80 a short section of like stainless steel tubing 84 encloses the entrance chamber 77, with a portion at one side cut away to afford an opening port 85. The top of the chamber 77 is partly closed by a thick disk of stainless steel 87 having a central aperture 88 through which the upper part of the thermocouple element 82 passes. Finally, another section of steel or stainless steel tubing 90, of similar wall thickness, extends above the partition 87 and is internally threaded at 91 to receive the male threads 92 of a tubular lance element 95. The entire assembly of tube sections 78, 84 and 90 and the transverse plates may be welded together as a unitary chamber device.

Although other thermocouple support means may be employed as shown in FIG. 1, the structure of FIG. 6 involves a cylindrical body 97 of appropriate heat-resistant and insulating character to abut the end of the lance tube 95 having a projecting ceramic or like cylinder 98 from which the thermocouple extends through the chamber 77 and into the chamber 76, while an upper portion 99 is removably attached within the lance tube 95, the entire arrangement being such that electrical connection is made through the support assembly to the thermocouple and the necessary conductors 100 for the thermocouple signal can be carried up through the lance tube 95.

The entire assembly, including the lower portion of the lance 95 is surrounded by a body of material for impeding destruction of the chamber, as for example the thick cardboard tube 102, snugly fitting the exterior of the chill structure 75. The bottom of the tube 102 is closed, to cover the plate 79, with a plug 103 of cast refractory or the like. A port 104 enters the wall of the tube 102 in registration with the port 85 and may have a thin metal lid 106 (to be melted away), like the lid 52 in FIGS. 1 and 3. The lid may be held in place by refractory cement 105 as in FIGS. 6 and 9, or alternatively by a steel wire 107 as in FIG. 9, which will promptly melt away. A quantity of killing metal, e.g. aluminum wire 110, can be disposed in the chamber section 77.

The probe is used in exactly the same manner as described above for the device of FIGS. 1 to 4, e.g. by dropping the long lance 95 so that the chamber port 104 is submerged well into the molten steel bath. The lid 106 being melted or removed, the molten metal flows through the port into the chamber 77 and thence downwardly into the sampling section 76. As it traverses the first chamber, the killing reaction of the aluminum is effected. The relatively quiescent sample body in the region 76 loses heat promptly to the chill structure, and the temperature reading from the thermocouple affords the desired determination of freezing point, or liquidus temperature, for corresponding analysis as to carbon content of the steel. This form of probe is especially suitable for furnace baths having a condition of high superheat. Tests have indicated that the high steel temperature reached in such situation, as may occur in a basic oxygen furnace, can sometimes occasion erratic freezing behavior and premature proble breakdown in single-chamber devices, but such problems are satisfactorily obviated, e.g. over a wide range of superheat, by a plural chamber design. It will be noted that the entry of the steel into the lower chamber 76 where the critical freezing and temperature determinations occur is somewhat delayed by passage through the entrance chamber 77, the walls of the latter exerting a preliminary chill effect and the killing reaction being also performed there. The arrangement provides an extended chill area, indeed essentially a maximum such area for the sample volume in the lower zone.

While other modes of assembly may be used, a convenient way is to fit the structure 75 into the tube 102 and apply the plug 103. The thermocouple unit including its support 97–99 being attached to the end of the probe 95, the latter is inserted in the tube 102 and screwed into the section 90. Finally the required amount of aluminum wire is stuffed through the port 104–85 and the latter closed by the element 106 and the wire 107. These operations can be rapidly performed, as at the platform 72 in FIG. 5, readying each new probe for use when desired.

FIG. 10 shows an alternate design of plural-chamber probe, where the tubular steel chill assembly 110 has a closed bottom 112 and a lateral partition 114 with an opening 115 to admit the thermocouple device 117. The latter element projects from supporting structure that may include an elongated cylindrical body 118 of strong, rigid refractory material, which can be attached at its upper end to a suitable lance member, not shown. The element 118 fits snugly in the upper part of the chill tube 110 so that the assembly affords an entrance chamber 120 and a sampling chamber proper 121.

The probe is externally encased by protective material, which can be heavy cardboard but which in this instance is shown as a body of settable refractory 123, except for an opening 124 which mates with the port 125 in the wall of chamber 120. Electrical leads 126, 127 for the thermocouple unit 117 may extend through appropriate insulation at an upper part of the chill tube 110. Aluminum kill wire 128 can be inserted into the chamber 120. The device of FIG. 10 functions essentially as that of FIGS. 6 to 9 and has been demonstrated to permit good readings of carbon content in high temperature molten steel (e.g. high superheat) of a basic oxygen furnace.

In FIG. 11 a bomb-type probe is illustrated, comprising a chamber and chill structure 130 with a surrounding cardboard tube 132 that may be essentially identical with any one of the immersion probes shown in other figures, the structure of FIG. 1 being here indicated simply for example. Around the tube 132 at a lower part, but above the sample port 134, a massive singer weight 136 is frictionally or otherwise secured, e.g. being from 10 to 20 pounds of steel, and having, if desired, a downturned, oppositely disposed pair of guide hooks 137, 138 to support the device on a suitable chute or rack, such as a spaced pair of rails (not shown) from which it can be pushed to fall vertically into the furnace. An extended length of conductor cable 140 entering the top end of the tube 132 and having insulation appropriate to resist impairment of the enclosed wires during the necessary ten to twenty seconds of test, is paid out from a coil 141 during the drop and has its other end connected to the necessary instrumentation for translating the temperature reading of the thermocouple in the probe. As will be appreciated, the general arrangement of the sinker weight 136, tube 132 and cable 140 may be similar to that used in bomb-type temperature probes heretofore.

The thermal analysis probe of FIG. 11 is simply dropped into the furnace and temperature reading made in the same fashion as for the immersion probes, it being found that the device remains sufficiently upright when it has become submerged, to insure proper filling of the sample chamber and freezing of the entrapped steel sample. While the bomb probe shares many advantages of the immersion probe, e.g. in permitting a fast operation and an essentially instantaneous electrical signal, with desirably precise results as to carbon determination and with no interference respecting the steel making process, it lacks the feature of permitting sampling at a closely controlled location of the bath and likewise generally does not permit withdrawal of a collected, solidified sample. Moreover, the immersion probes, as in FIGS. 1 to 10, can usually be much less expensive, low cost being an important aspect of any device which is expended in a single use.

Reverting to the probe of FIGS. 1 to 4, it is sometimes desirable to have an air vent for the sampling chamber, for example as by providing a vertical groove 144 in the wall of the support structure 20. Similar venting means can be included in the devices of FIGS. 6 and 10, although present indication is that the provision of one or more upper chambers in the chill-enclosed structure obviates the need for a special vent.

For good practical results, the size of the sampling chamber, as at 22 in FIG. 1 or 76 in FIG. 6, can be relatively small, and is suitably related (as can be readily determined, even by tests if necessary) to the dimensions and heat capacity of the chill structure which encloses it, e.g. usually its sides and preferably also its bottom and indeed desirably at least part of its top and upper structure. Sampling chambers for these devices have been conveniently made of an inside axial length of 1 to 2 inches and an inside diameter of like dimension (preferably 1.5 to 2 inches), for an enclosing stainless steel chill with a wall thickness of ⅛ to 3/16 inch. Chamber volumes of 0.8 cubic inch and above have provided long enough freezing periods for good measurement; effective but not over-long periods have been noted with a volume of about 1.3 cublic inches, enclosing about ⅜ pound (170 grams) of steel. Even somewhat larger chambers are sometimes preferable, with adequate chill capacity. For example, in one embodiment of the device of FIG. 6, the chill parts 78, 79, 80, 84 and 87 have a thickness of ⅛ inch, the internal diameter of the sample chamber proper 76 and of the entrance chamber 77 being about 1⅜ inch, and these regions being respectively 1⅜ and ½ inches long, so that the volume of the chamber 77 is about 2 cubic inches. The outer cardboard tube 102 may have a ⅝ to ¾ inch wall, and the refractory plug may be ½ to 1 inch thick. Various refractories can be used at various parts of the probes, such as fire clay or other castable, ceramic or like refractory compositions generally suitable for coating, cementing or lining at localities of exposure to molten steel.

While one function of the thin lids preferred for the ports of the probes of FIGS. 1 and 6, and also (although not shown) for those of FIGS. 10 and 11, is to prevent entry of slag as the device goes down into the liquid metal, some utility is envisaged for collecting a slag sample (for test) along with the metal, and in such cases the lid may be omitted as to the immersion probes, usually without seriously impeding the thermal analysis operation.

As explained the rapid analysis of the present invention is based on the principle that solutions which comprise more than one substance, melt or solidify within a temperature range: freezing begins at the liquidus temperature and is complete at the solidus temperature. While both points are functions of the composition of the liquid system, useful for determining such composition under appropriate circumstances, and while the present apparatus is conceived to be broadly applicable to detecting any temperature of freezing point significance, the operations described above are primarily concerned (for special rapidity and reliability) with ascertainment of data accurately related to the liquidus temperature, i.e. which approaches an isothermal function during freezing, sometimes called the temperature of liquidus thermal arrest. Indeed the probes are particularly designed to have a sufficiently long freezing time for good definition of this value, as for visual or electronic reading.

Thus FIGS. 12-A and 12-B show the shape of tracings of temperature made with a suitable high-speed recorder utilizing a probe such as shown in FIG. 1 in the molten steel of open hearth furnaces under normal operating conditions. It will be noted that the plot of sensed temperature rises almost instantaneously, e.g. as the sampling chamber fills, and then exhibits a vertical or substantially non-changing shape, which is easily read as the liquidus temperature. In the instance of FIG. 12-A such determination was possible within seven seconds after immersion, and FIG. 12-B within twelve seconds after immersion.

FIGS. 13-A, 13-B and 13-C, which can be read with an approximate temperature scale beneath FIG. 13-C, show representative tracings of the temperature recorder with probes of the plural-section type (e.g. as in FIG. 10) when inserted in steel furnace melts having considerable superheat, such as may occur in basic oxygen furnaces. As apparent, the recorded temperature reaches a relatively high value, and then decreases until the sample begins to freeze, whereupon an isothermal condition appears, again represented by a portion of the trace which is relatively straight, i.e. non-varying on the temperature scale. Hence temperature values read at points $(a)$, $(b)$ and $(c)$ of these figures can be taken as significant of carbon content in the steel.

In general the translation of liquidus temperature readings into percentages of carbon is simply and directly made, and indeed this correlation is basically well known, as from its use by the spoon-sampling technique mentioned hereinabove. Of course the measuring or detecting instrument must be properly calibrated for a true indication of temperature with the selected type of thermocouple, the mode of such calibration being likewise known in the art of steel temperature measurement. For completeness, it may be noted that increase or decrease of 0.1% of carbon in the steel changes the freezing (liquidus) temperature by about 15° F., throughout a total range of carbon content from below 0.1% up to about 2.0%, the freezing temperature increasing with lower carbon content. For example, analysis of samples by other modes has shown that in using the probes of the present invention, a freezing point around 2600° F. represents 1.2% to 1.3% carbon, 2650° F. shows 0.9% to 1.0% carbon, to 2700° F. corresponds to 0.5% to 0.6% and 2750° F. signifies values in the neighborhood of 0.15%, with higher temperatures being shown for still smaller carbon content.

To the extent that the actual scale may vary slightly with other compositional characteristics of the bath or type of treatment, it will be understood that simple testing and correlation of experience will afford a more specific calibration in actual use. Indeed experience has shown that the system of thermal analysis is readily applicable for carbon determination with abundant accuracy for process control purposes, and is capable of carbon determinations which do not vary from the results of specially precise analysis by more than about 0.05% carbon content, or even lower values. In fact it appears that the errors of the system are inconsequentially small, being well within those of commonly used techniques of sampling and chemical carbon analysis.

It is to be understood that the invention is not limited to the specific devices and steps hereinabove described, but may be carried out in other ways without departure from its spirit.

We claim:
1. A probe insertable into molten metal for thermal analysis thereof, comprising temperature-sensing means, means providing a chamber to receive a sample of molten metal to be sensed by said temperature-sensing means, said chamber means including metal-freezing chill structure interiorly defining at least a part of the chamber and an enclosing mass of protective material for impeding destruction of the chamber by surrounding molten metal, and said chamber means having an opening for entry of molten metal, disposed to entrap a sample thereof in the chamber, said chamber including a transverse partition disposed below the aforesaid opening and apertured for passage of metal downwardly through it to collect as a sample in the chamber region below the partition, the temperature-sensing means being arranged to detect the temperature of the sample metal in said last-mentioned region, the aforesaid opening extending into the chamber at an upper locality thereof above the partition, and said temperature-sensing means having means connected thereto and arranged to extend upward above the molten metal in which the probe is inserted, for conducting signals from the temperature-sensing means.

2. A probe as defined in claim 1, in which said partition is a heat-absorbing metal member constituting part of the chill structure, said chill structure also comprising a mass of metal constituting substantially the entire vertical wall of the chamber, for absorbing heat from the received sample of molten metal.

3. A probe as defined in claim 2, which is adapted for thermal analysis of molten steel and in which the metal of the said mass constituting the vertical wall of the chamber is steel.

4. A probe as defined in claim 1, in which the temperature-sensing means comprises thermocouple means, means supporting said thermocouple means to be submerged in the received sample of molten metal, said supporting means comprising structure extending downwardly through the chamber from above the aforesaid opening and through the aperture of the partition so that the thermocouple means projects into the chamber region below the partition.

5. A probe as defined in claim 1, which is adapted for thermal analysis of molten steel and which includes a quantity of killing metal disposed in the chamber above the partition, for killing reaction in the metal of the sample as the latter is received.

6. A probe as defined in claim 1, in which the chill structure comprises a mass of stainless steel constituting substantially the entire vertical wall and the bottom of the chamber.

7. A probe insertable into molten steel for thermal analysis thereof, comprising thermocouple means, structure for supporting the same to project therefrom, means providing a chamber around said thermocouple means, said chamber means including transverse partitioning means to constitute two separated regions extending downward in succession from the aforesaid supporting structure, said thermocouple means extending through an aperture in said partitioning means to the second region spaced from the supporting structure, metal chill structure exposed substantially throughout the interior of the chamber means, for contact with molten metal in both the aforesaid regions, a quantity of oxidizable metal in the first region adjacent said supporting structure for killing admitted molten steel, said chamber means having at least one opening for admitting molten steel into the first region and thence through the aforesaid aperture into the second region, and said chamber means including surrounding material for impeding destruction of the chamber by molten steel.

8. A probe as defined in claim 7, in which said metal chill structure comprises a mass of metal substantially completely defining both the aforesaid regions of said chamber means, including said partitioning means, for absorbing heat from the admitted molten steel at least sufficiently to initiate freezing of the molten steel received in the second region.

9. A probe as defined in claim 8, which is constructed and arranged for attachment to means whereby the probe may be withdrawn from molten steel in which it has been inserted, and in which said mass of metal of the chill structure is steel and said chill structure is constructed and arranged to effectuate complete solidification of the molten steel received in the second region, by absorption of heat in said chill structure, whereby a solid sample of steel may be obtained upon withdrawal of the probe.

10. A probe as defined in claim 9, in which said mass of metal is stainless steel.

References Cited

UNITED STATES PATENTS

| | | | |
|---|---|---|---|
| 3,295,171 | 1/1967 | Strange et al. | 22—1 |
| 3,374,122 | 3/1968 | Cole | 73—359 |
| 3,455,164 | 7/1969 | Boyle | 73—354 |
| 3,463,005 | 8/1969 | Hance | 73—341 |
| 3,481,201 | 12/1969 | Falk | 73—359 |

JAMES J. GILL, Primary Examiner

H. GOLDSTEIN, Assistant Examiner

U.S. Cl. X.R.

73—354, 425.4